US007262753B2

(12) United States Patent
Tanghe et al.

(10) Patent No.: US 7,262,753 B2
(45) Date of Patent: Aug. 28, 2007

(54) METHOD AND SYSTEM FOR MEASURING AND CONTROLLING AN OLED DISPLAY ELEMENT FOR IMPROVED LIFETIME AND LIGHT OUTPUT

(75) Inventors: Gino Tanghe, Merkem (BE); Robbie Thielemans, Nazareth (BE); Nele Dedene, Houthalen-Helchteren (BE)

(73) Assignee: Barco N.V., Kortrijk (BE)

( * ) Notice: Subject to any disclaimer, the term of this patent is extended or adjusted under 35 U.S.C. 154(b) by 418 days.

(21) Appl. No.: 10/637,458

(22) Filed: Aug. 7, 2003

(65) Prior Publication Data

US 2005/0030267 A1 Feb. 10, 2005

(51) Int. Cl.
*G09G 3/30* (2006.01)
*G09G 3/36* (2006.01)
*G09G 5/00* (2006.01)
*G06F 3/038* (2006.01)

(52) U.S. Cl. .......................... 345/82; 345/77; 345/101; 345/204; 345/214

(58) Field of Classification Search .................. 345/82
See application file for complete search history.

(56) References Cited

U.S. PATENT DOCUMENTS 5,594,463 A 1/1997 Sakamoto
5,796,376 A 8/1998 Banks
5,805,117 A * 9/1998 Mazurek et al. ............. 345/1.3
6,310,589 B1 10/2001 Nishigaki et al.
6,337,542 B1 * 1/2002 Hanaki et al. ........... 315/169.3
6,369,786 B1 * 4/2002 Suzuki ........................ 345/77
6,376,994 B1 * 4/2002 Ochi et al. ............... 315/169.1
6,414,661 B1 * 7/2002 Shen et al. ................... 345/82
6,486,607 B1 11/2002 Yeuan
6,747,618 B2 * 6/2004 Arnold et al. ................ 345/77
2002/0167474 A1 * 11/2002 Everitt ........................ 345/82
2003/0048243 A1 3/2003 Kwasnick
2004/0150590 A1 * 8/2004 Cok et al. ..................... 345/76

FOREIGN PATENT DOCUMENTS

EP 1079361 A1 2/2001
JP 2002278514 A * 9/2002
WO WO99/41732 A2 8/1999

* cited by examiner

*Primary Examiner*—Sumati Lefkowitz
*Assistant Examiner*—Alexander S. Beck
(74) *Attorney, Agent, or Firm*—Barnes & Thornburg, LLP

(57) ABSTRACT

A method of optimizing lifetime of an OLED display element and an OLED display element with optimized lifetime for possible use in a tiled display, while maintaining light output are described. It compensates an OLED operating parameter such as supply voltage and/or on-time of the operating current based on at least one environmental factor which affects aging and on at least one operating factor which is indicative of aging, e.g. by determining the brightness of an OLED display element. To optimize the light output, pre-charge of the aged OLED display elements can be optimized. The knowledge of the working temperature of OLED tiles may be used to regulate the cooling and thus the working temperature, thus improving the lifetime of the display. Furthermore the intensity and contrast of the display illumination may be set within predefined limits to reduce the aging.

28 Claims, 3 Drawing Sheets

300

METHOD AND SYSTEM FOR MEASURING AND CONTROLLING AN OLED DISPLAY ELEMENT FOR IMPROVED LIFETIME AND LIGHT OUTPUT

FIELD OF THE INVENTION

The present invention relates to a modular organic light-emitting diode (OLED) display. In particular, this invention relates to a system for and method of measuring and controlling an OLED display element for improved lifetime and light output.

BACKGROUND OF THE INVENTION

OLED technology incorporates organic luminescent materials that, when sandwiched between electrodes and subjected to a DC electric current, produce intense light of a variety of colors. These OLED structures can be combined into the picture elements, or pixels, that comprise a display. OLEDs are also useful in a variety of applications as discrete light-emitting devices or as the active element of light-emitting arrays or displays, such as flat-panel displays in watches, telephones, laptop computers, pagers, cellular phones, calculators, and the like. To date, the use of light-emitting arrays or displays has been largely limited to small-screen applications such as those mentioned above.

The market is now, however, demanding larger displays with the flexibility to customize display sizes. For example, advertisers use standard sizes for marketing materials; however, those sizes differ based on location. Therefore, a standard display size for the United Kingdom differs from that of Canada or Australia. Additionally, advertisers at trade shows need bright, eye-catching, flexible systems that are easily portable and easy to assemble/disassemble. Still another rising market for customizable large display systems is the control room industry, where maximum display quantity, quality, and viewing angles are critical. Demands for large-screen display applications possessing higher quality and higher light output has led the industry to turn to alternative display technologies that replace older LED and liquid crystal displays (LCDs). For example, LCDs fail to provide the bright, high light output, larger viewing angles, and high resolution and speed requirements that the large-screen display market demands. By contrast, OLED technology promises bright, vivid colors in high resolution and at wider viewing angles. However, the use of OLED technology in large-screen display applications, such as outdoor or indoor stadium displays, large marketing advertisement displays, and mass-public informational displays, is only beginning to emerge.

Several technical challenges exist relating to the use of OLED technology in large-screen applications. Presently, in the case of a small-screen application in which the display typically consists of a single OLED display panel, OLEDs age more or less uniformly. Thus, when the light output is no longer suitable, the entire display is replaced. However, for large-screen applications, where the display may consist of a set of tiled OLED display panels, there is the possibility that one OLED display will age at a faster rate than another. Typically, when a tiled OLED display is manufactured, it is calibrated for a uniform image. Age differences occur, for example, due to the varying ON times (i.e., the amount of time that the OLED has been active) of the individual OLEDs and due to temperature variations within a given OLED display area. In addition, age differences in the overall display may exist due to replacement of an older tile with a newer tile. Tiles may be replaced when a module is damaged or found to be defective. The result of using the display's modularity to replace individual tiles is non-uniformity of the overall display, as the light output of newer replacements may be inconsistent with older existing OLED modules.

An example of a method to correct non-uniformities in an initially calibrated OLED display device is described in WO 01/63587, entitled, "Method and apparatus for calibrating display devices and automatically compensating for loss in their efficiency over time." The '587 patent application describes a method of OLED compensation for loss of uniformity of the display output of a display including organic light-emitting devices (OLED) due to aging. Since the decay of emitted light follows an exponential law, change in light output due to aging can be predicted by accumulating (i.e., performing numeric integration) the driving current for each individual pixel during an elapsed time. Then, based on such predicted change, the driving current can be adjusted for each pixel to compensate the decay.

Another example of a method to correct non-uniformities in an initially calibrated OLED display is described in WO 99/41732, entitled, "Tiled electronic display structure". The '732 patent application describes a method of compensation for loss in brightness due to aging of OLEDs in a display tile. Two methods for electronic compensation are described: integrating current during an elapsed time and comparing it to a characteristic curve, and measuring the change in voltage due to aging, which change in voltage is proportional to a change in brightness of the OLEDs. Both methods allow to adjust the drive current of the OLEDs, thus automatically maintaining a constant brightness without manual adjustments.

Although the compensation techniques described in the '587 and '732 patent applications provide a satisfactory means of compensation for many OLED applications, it does not adequately address the concerns of a display composed of many discrete tiles of various ages that are subjected to different aging conditions.

It is therefore an object of the invention to provide a method and device for optimizing uniformity in the light output and color over the lifetime of devices in which light output may deteriorate, and colors may shift due to aging, more particularly, but not limited to, an OLED display device, particularly a tiled OLED display device.

It is a further object of the present invention to increase the lifetime of an OLED display, more particularly, but not limited to, a tiled OLED display device by maintaining uniformity in the light output and color over a longer lifetime of the device.

SUMMARY OF THE INVENTION

The present invention provides an OLED display tile that monitors and records the factors that contribute to its aging and compensates for them. In accordance with an aspect of the present invention an OLED display or display tile is provided that can measure an environmental factor which affects aging, especially an environmental temperature. In addition, other factors which affect aging may be measured such as ON time, and various other factors responsible for aging. The disclosed devices can adjust the OLED voltage source and drive current appropriately to maintain consistent color and uniform illumination across the entire display at levels that minimize aging. In addition it is preferred that the disclosed OLED display or display tile regulates its cooling to prolong display lifetime.

The present invention relates to a system for and a method of optimizing lifetime of an OLED display element, for possible use in a tiled display, while maintaining light output. It compensates the OLED drive parameters such as supply voltage and/or on-time of the operating current based on at least one environmental factor which affects aging and on at least one operating factor which determines the brightness of an OLED display element. The environmental factor is preferably one related to the operating temperature of the display and/or each display element of the OLED display. Such an environmental factor can be the ambient temperature. From the known ambient temperature plus the drive current history of each pixel, the actual operating temperature can be estimated. For example, an analytical model for an OLED display may be constructed which allows estimation of the temperature based on the ambient temperature and an estimate of the ON-current and the known cooling characteristics. The ON-current can be estimated from the input video signal taking into account the properties of the OLED display and the factors affecting the translation of a video signal of a certain amplitude into the drive signal for OLED display elements. The operating factor may be, for example, the voltage across the current driver. This can e.g. be used to determine the threshold voltage or the normal operating voltage of the OLED pixel or to determine a change in time duration required for a voltage across the OLED pixel to attain its threshold voltage or to attain its normal operating voltage. The measured temperature and the measured voltage across the current driver for each OLED pixel may be stored in a memory device. Furthermore or alternatively the system may optimize the pre-charging of the OLEDs to optimize the light output. The measured or estimated temperature may also be used to regulate the working temperature of the OLED, possibly by adapting cooling, so as to improve the lifetime of the OLED display characteristics, e.g. in a tiled display by reducing temperature differences between different tiles. The intensity and contrast of the display illumination may be set within predefined limits to reduce aging.

The present invention provides a method for optimizing lifetime of an OLED display element comprising a plurality of addressable discrete OLED pixels, each of said OLED pixels being driven by a supply voltage and a drive current provided by a current driver and each OLED pixel having a threshold voltage. The method comprises, for an OLED pixel: determining an environmental parameter which affects aging of the OLED pixel, determining a first operational parameter indicative of aging of the OLED pixel, and compensating at least partly for aging by changing a second operating parameter of the OLED pixel based on the determination of the environmental parameter and the first operational parameter.

The environmental parameter may be obtained by measuring a temperature of the OLED pixel. Determining the environmental parameter may include measuring an ambient temperature and estimating the temperature of the OLED pixel from the measured environmental temperature. The method may furthermore comprise storing the measured temperature for each OLED pixel.

The first operational parameter may be obtained by measuring a voltage across the current driver to determine the threshold voltage or the normal operating voltage of the OLED pixel. The method may furthermore comprise storing the measured voltage across the current driver for each OLED pixel.

The second operational parameter may be at least one of on-time of the current driver or supply voltage to the OLED pixel.

The method according to the present invention may furthermore comprise measuring the voltage across the current driver to determine a change in time duration required for a voltage across the OLED pixel to attain its threshold voltage or the normal operating voltage.

The method according to the present invention may furthermore comprise determining an optimal pre-charge required for each OLED pixel. Determining an optimal pre-charge may comprise determining an OLED drive voltage.

The method according to the present invention may be applied to a tiled display comprising a plurality of OLED display tiles. The method may furthermore comprise reducing temperature differences over two different OLED display tiles. Reducing temperature differences over two different OLED display elements may comprise adjusting a cooling.

Intensity and contrast of OLED pixels may be set within predefined limits to reduce aging of the OLED display element.

The present invention also provides an OLED display element comprising a plurality of addressable discrete OLED pixels, each of said OLED pixels being driven by a supply voltage and a drive current provided by a current driver and each OLED pixel having a threshold voltage. The display element further comprises: means for determining an environmental parameter which affects aging of an OLED pixel, means for determining a first operational parameter indicative of aging of the OLED pixel, and means for at least partly compensating for aging by changing a second operating parameter of the OLED pixel based on the determination of the environmental parameter and the first operational parameter.

The means for determining an environmental parameter may be a temperature measurement means for measuring the temperature of an OLED pixel. The means for determining an environmental parameter may also be a temperature measurement means for measuring an ambient temperature, further comprising means for estimating a temperature of the OLED pixel from the ambient temperature.

The means for determining a first operating parameter may be voltage measurement means for measuring a voltage across the current driver to determine the threshold voltage or the normal operating voltage of the OLED pixel.

The compensation means may change at least one of on-time of the current driver or supply voltage to the OLED pixel.

The OLED display element according to the present invention may further comprise a memory element for storing the measured temperature for at least one OLED pixel. The OLED display element may comprise a memory element for storing the measured voltage across the current driver for at least one OLED pixel.

The OLED display element may furthermore comprise a pre-charge adaptation means. The pre-charge adaptation means may comprise means for determining an OLED drive voltage.

The present invention also provides an OLED display element according to the present invention in a tiled display comprising a plurality of OLED display tiles.

The OLED display element according to the present invention may furthermore comprise means for reducing temperature differences over two different OLED display tiles.

The OLED display element may furthermore comprise means for setting intensity and contrast of OLED pixels within predefined limits to reduce aging of the OLED display element.

In another aspect, the present invention also discloses an OLED display system comprising a set of tiled OLED display panels, wherein each display panel is according to the present invention as described above.

In another aspect a control device for controlling an OLED display element is provided. The display element comprises a plurality of addressable discrete OLED pixels, each of said OLED pixels being driven by a supply voltage and a drive current controlled by the control device, each OLED pixel having a threshold voltage. The control device comprises:

means for determining an environmental parameter which affects aging of an OLED pixel, means for determining a first operational parameter indicative of aging of the OLED pixel, and means for compensating at least partly for aging by changing a second operating parameter of the OLED pixel based on the determination of the environmental parameter and the first operational parameter.

The present invention will now be described with reference to the following drawings.

DETAILED DESCRIPTION OF ILLUSTRATIVE EMBODIMENTS

Figure 1:
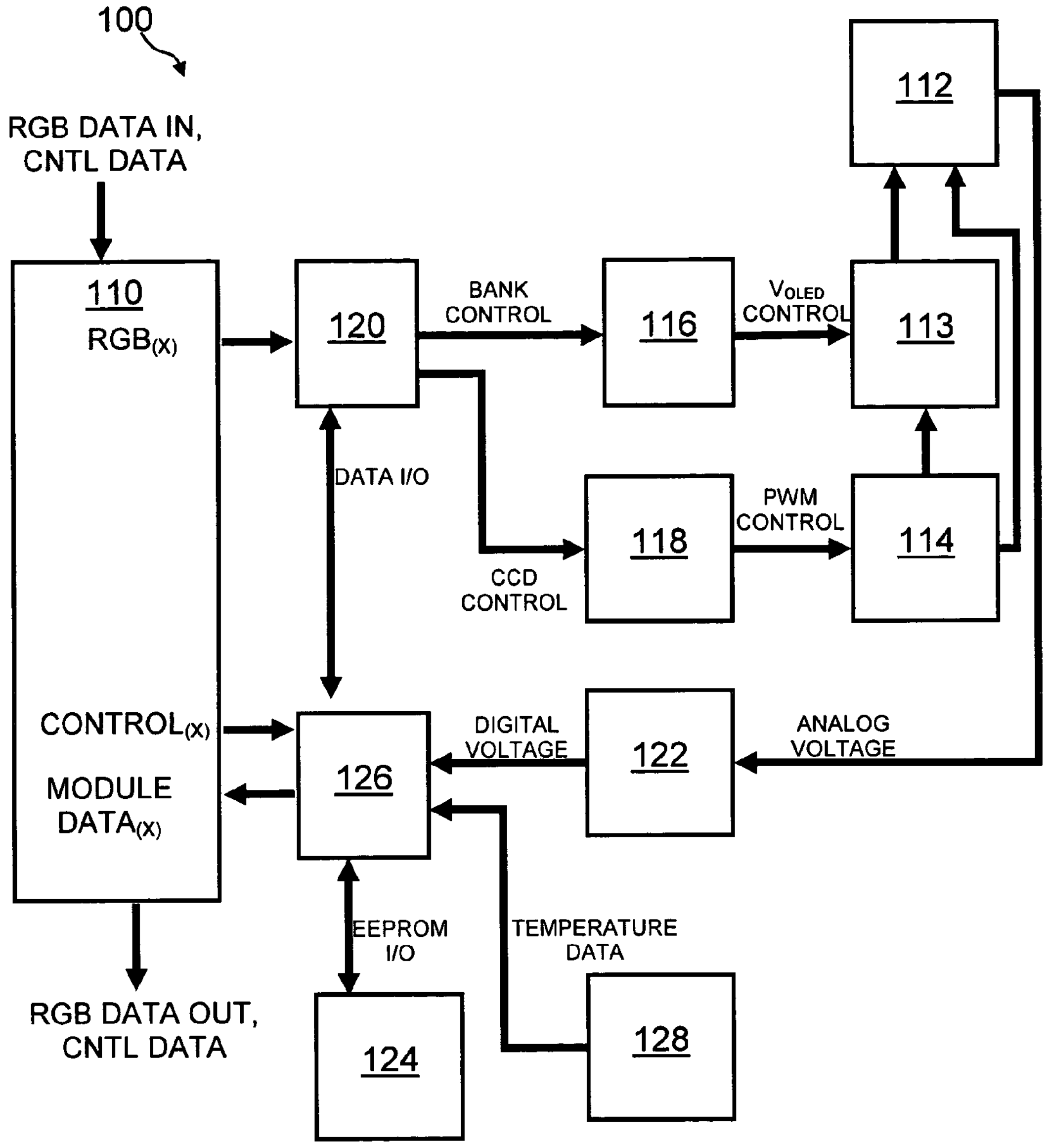
FIG. 1 illustrates a functional block diagram of an OLED tile control system for use in the OLED tile assembly in accordance with an embodiment of the present invention.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

The present invention will mainly be described with reference to a single display but the present invention is not limited thereto. For instance, the display may be extendable, e.g. via tiling, to form larger arrays. Hence, the present invention may also include assemblies of pixel arrays, e.g. they may be tiled displays and may comprise modules made up of tiled arrays which are themselves tiled into supermodules. Thus, the word display relates to a set of addressable pixels in an array or in groups of arrays. Several display units or "tiles" may be located adjacent to each other to form a larger display, i.e. multiple display element arrays are physically arranged side-by-side so that they can be viewed as a single image. The arrangement in tiles normally means that some tiles are located above other tiles, i.e. when the display is vertically mounted. Heat from lower tiles rises and affects the environment of tiles higher in the display. Thus, in a large displays the thermal environment of each tile can be different.

The present invention relates to a method and device of measuring and controlling an OLED display element for improved lifetime and light output. An OLED display incorporating the method of the present invention compensates the OLED operating conditions of the OLED display such as supply voltage and operating current based on measures of the operation of the OLED display which affect aging of the display such as the ON time and operating temperature to achieve greater uniformity of illumination across the display and to reduce color shifts. The compensation for aging does not necessarily compensate perfectly for aging effects. This might result in an increased rate of aging as the system attempts to reach contrast and luminosity values which require overdriving of aged pixels. Thus included within the scope of the present invention is that the complete aging effect is only compensated to a certain degree. The present invention also provides compensation that optimally utilizes a unique OLED circuit topology associated with pre-charging OLEDs to optimize the light output of the display. Pre-charging of OLEDs is applied to overcome the limitation of the on/off rate of the device due to large charging times of the inherent capacitances of the OLED devices, which is especially important in large-screen applications. An OLED tile assembly of the present invention also maximizes the lifetime of an OLED display by managing its self-heating within limits through the effective use of tile-based cooling systems and by regulating the intensity and contrast of the display illumination within predefined limits.

FIG. 1 illustrates a functional block diagram of an OLED tile control system 100 for use in an OLED tile assembly (not shown) in accordance with an embodiment of the present invention. OLED tile control system 100 performs the local processing and control functions needed to operate an OLED array 112. OLED array 112 may be part of a tiled display. FIG. 1 illustrates OLED array 112, a plurality of bank switches 113, a plurality of current sources ($I_{SOURCES}$) 114, an analog-to-digital (A/D) converter 122, an EEPROM 124, a means for determining an environmental parameter, such as for example a temperature sensor 128, a tile processing unit 110, a bank switch controller 116, a constant current driver (CCD) controller 118, a pre-processor 120, and a module interface 126.

FIG. 1 further illustrates that tile processing unit 110 is fed by an incoming red, green, blue data signal RGB DATA IN that is a serial data signal containing the current video frame information to be displayed on OLED array 112. Tile processing unit 110 subsequently buffers the incoming data signal RGB DATA IN and outputs an outgoing data signal RGB DATA OUT. Additionally, control data (CTNL DATA) from a general processor (not shown), such as a personal computer (PC) for example, that functions as the system-level controller of the OLED tile assembly is supplied to tile processing unit 110 via a CNTL DATA bus. The CNTL DATA bus is a serial data bus that provides control information to OLED tile control system 100, such as color temperature, gamma, and imaging information. Tile processing unit 110 subsequently buffers the control data from the CNTL DATA bus for supplying an output control data signal to an outgoing CNTL DATA bus. Tile processing unit 110 buffers the RGB DATA signal and the CNTL DATA bus for transmission to a next OLED tile assembly (not shown) in a tiled display system.

Tile processing unit 110 of each OLED tile control system 100 associated with an OLED array 112 in a tiled display system receives the RGB data signal RGB DATA IN and subsequently parses this information into specific packets associated with the location of a given OLED tile assembly within an entire tiled OLED display (not shown). Algorithms running on tile processing unit 110 facilitate the process of identifying the portion of the serial RGB data input signal RGB DATA IN that belongs to its physical portion of the tiled OLED display. Subsequently, tile processing unit 110 distributes a serial RGB signal $RGB_{(x)}$ to pre-processor 120, which RGB signal $RGB_{(x)}$ belongs to a physical portion of the tiled OLED display.

Similarly, tile processing unit 110 receives the control data on the control data bus CNTL DATA and subsequently parses this information into specific control buses associated with the location of a given OLED tile assembly. Subsequently, tile processing unit 110 distributes a control signal $CONTROL_{(x)}$ that provides control information, such as color temperature, gamma, and imaging information for the given OLED tile assembly.

The elements of OLED tile control system 100 are electrically connected as follows. The RGB signal $RGB_{(x)}$ from tile processing unit 110 feeds pre-processor 120; a control bus output BANK CONTROL of pre-processor 120 feeds bank switch controller 116; a control bus output CCD CONTROL of pre-processor 120 feeds CCD controller 118; a control bus output $V_{OLED}$ CONTROL of bank switch controller 116 feeds bank switches 113 that are connected to the row lines of OLED array 112; and a pulse width modulation control bus output PWM CONTROL of CCD controller 118 feeds current sources $I_{SOURCES}$ 114 that are connected to the column lines of OLED array 112 via conventional active switch devices, such as MOSFET switches or transistors. A bus output ANALOG VOLTAGE of OLED array 112 feeds A/D converter 122; a bus output DIGITAL VOLTAGE of A/D converter 122 feeds module interface 126; and a bus output TEMPERATURE DATA of temperature sensor 128 feeds module interface 126. The control bus output $CONTROL_{(X)}$ of tile processing unit 110 also feeds module interface 126. Furthermore, an input/output bus EEPROM I/O exists between EEPROM 124 and module interface 126; an input/output bus DATA I/O exists between pre-processor 120 and module interface 126; and, lastly, module interface 126 drives a data bus MODULE $DATA_{(x)}$ to tile processing unit 110. Critical diagnostic information, such as temperature, aging factors, and other color correction data, is available to tile processing unit 110 via the data bus MODULE $DATA_{(x)}$.

The elements of the OLED tile control system 100 and their functions are provided below:

OLED array 112 includes a plurality of addressable discrete OLED devices, i.e., pixels. Those skilled in the art will appreciate that the OLED devices for forming a graphics display are typically arranged logically in rows and columns to form an OLED array, as is well known. The term "logically arranged in rows and columns" refers to the fact that the actual display does not have to be formed in Cartesian co-ordinates but may be provided in other co-ordinate systems such as polar. However, in all of these systems there are equivalents to rows and columns, e.g. arcs of circles and radii. These are therefore logically arranged in rows and columns even if they are not physically arranged in such a manner. OLED array 112 may be configured as a common-anode, passive-matrix OLED array. In the common-anode configuration, a current source is arranged between each individual cathode of the OLED devices and ground, while the anodes of the OLED devices are electrically connected in common to the positive power supply. As a result, the current and voltage are completely independent of one another and small voltage variations do not result in current variations eliminating light output variations due to voltage variations.

Bank switches 113 may be conventional active switch devices, such as MOSFET switches or transistors. Bank switches 113 connect positive voltage sources to the rows of OLED array 112 and are controlled by the control bus $V_{OLED}$ CONTROL of bank switch controller 116. Current sources $I_{SOURCES}$ 114 may be conventional current sources capable of supplying a constant current, typically in the range of 5 to 50 mA. Examples of constant current devices include a Toshiba TB62705 (8-bit constant current LED driver with shift register and latch functions) and a Silicon Touch ST2226A (PWM-controlled constant current driver for LED displays). The control bus PWM CONTROL of CCD controller 118 controls the active switches connecting current sources $I_{SOURCES}$ 114 to the columns of OLED array 112. OLED array 112 also provides feedback of the voltage value across each current source $I_{SOURCE}$ 114 via the bus ANALOG VOLTAGE.

Bank switch controller 116 contains a series of latches that store the active state of each bank switch 113 for a given frame. In this manner, random line addressing is possible, as opposed to conventional line addressing, which is consecutive. Furthermore, pre-processor 120 may update the values stored within bank switch controller 116 more than once per frame in order to make real-time corrections to the positive voltage $+V_{OLED}$ driving a line of OLED pixels based on temperature and voltage information received during the frame. For example, an increase in temperature during a frame output may trigger a voltage reading command where bank switch controller 116 enables the positive voltage+ $V_{OLED}$ to the requested OLED devices within OLED array 112.

CCD controller 118 converts data from pre-processor 120 into PWM signals, i.e., signals on the control bus PWM CONTROL, to drive current sources $I_{SOURCES}$ 114 that deliver varying amounts of current to the OLED devices or pixels within OLED array 112. The width of each pulse within the control bus PWM CONTROL dictates the amount of time a current source $I_{SOURCE}$ 114 associated with a given OLED device will be activated and deliver current. Additionally, CCD controller 118 sends information to each current source $I_{SOURCE}$ 114 regarding the amount of current to drive, which is typically in the range of 5 to 50 mA. The amount of current is determined from the brightness value, Y, for a given OLED device, which brightness value is calculated in pre-processor 120.

Pre-processor 120 develops local color correction, aging correction, black level, and gamma models (correction values may be stored in internal look-up tables (not shown) or in EEPROM 124) for the current video frame using information from module interface 126. Pre-processor 120 combines the RGB data of the RGB signal $RGB_{(X)}$ describing the current frame of video to display with the newly developed color correction algorithms and produces digital control signals, i.e., the signals on the buses BANK CONTROL and CCD CONTROL, for bank switch controller 116 and CCD controller 118, respectively. These signals dictate exactly which OLED devices within OLED array 112 to illuminate and at what intensity and color temperature in order to produce the desired frame at the required resolution and color-corrected levels. In general, the intensity, or grayscale value, is controlled by the time integrated amount of current (i.e. the absolute value of the current+the time during which this current is fed to the OLED) used to drive an OLED device. Similarly, the color temperature is controlled by the grayscale color value and the relative proximity of each sub-pixel required to produce the desired color. For example, a bright orange color is produced by illuminating a green sub-pixel in close proximity to a brightly lit red sub-pixel. Therefore, it is important to have precise control over the brightness and the amount of time an OLED device is lit.

A/D converter 122 uses the analog voltage values, i.e., signals on the bus ANALOG VOLTAGE, from OLED array 112 and outputs the voltage information back to module interface 126 via the bus DIGITAL VOLTAGE. A first operational parameter indicative of aging of an OLED device, such as e.g. the voltages across each current source $I_{SOURCE}$ 114 (i.e., cathode voltages) are monitored so that correct aging factors and light output values may be calculated in order to further produce the correct amounts of driving current through each OLED device within OLED array 112. The voltages across the OLED devices within OLED array 112 can be calculated as measured power supply voltage minus the voltage across current source $I_{SOURCES}$ 114. Pre-processor 120 compares a pre-stored voltage level for each OLED device within OLED array 112 with the measured power supply voltage minus the voltage value measured by A/D converters 122 to determine whether digital voltage correction is plausible. If the voltage across a specific OLED device is below a maximum voltage, digital correction may be implemented through color correction algorithms. However, if the voltage is greater than the maximum voltage, an adjustment must be made to a second operating parameter of the OLED device, such as the overall supply voltage. Digital voltage correction is preferred to supply voltage correction because it allows finer light output control for specific OLED devices within OLED array 112.

EEPROM 124 may be any type of electronically erasable storage medium for pervasively storing diagnostic and color correction information. For example, EEPROM 124 may be a Xicor or Atmel model 24C16 or 24C164. EEPROM 124 holds the most recently calculated color correction values used for a preceding video frame, specifically, gamma correction, aging factor, color coordinates, and temperature for each OLED array 112. All factory and calibration settings may be stored in EEPROM 124 as well.

The aging factor of an OLED device is a value based on the total ON time and total amount of current through each OLED device within OLED array 112. Other information may be stored in EEPROM 124 at any time without deviating from the spirit and scope of the present invention. Communication to EEPROM 124 is accomplished via the EEPROM I/O bus. An advantage to locally storing color correction and additional information specific to an OLED tile assembly on EEPROM 124 is that valuable color correction, aging factors, and other operation details are transported within the OLED tile assembly. This allows switching tiles without losing the necessary correction information.

Module interface 126 serves as an interface between tile processing unit 110 and all other elements within OLED tile control system 100. Module interface 126 collects the current temperature data from temperature sensor 128 and the current color coordinate information (tri-stimulus values in the form of x,y,Y), aging measurements, and runtime values from EEPROM 124 for each OLED device within OLED array 112. In addition, module interface 126 collects the digital voltage values during the ON time of each OLED device within OLED array 112 from A/D converters 122. Module interface 126 also receives control data, i.e., the signal on the bus $CONTROL_{(X)}$, from tile processing unit 110, which dictates to pre-processor 120 how to perform color correction (from a tile-level point of view) for the current video frame.

Temperature sensor 128 may be a conventional sensing device that takes temperature readings of the OLED devices within OLED array 112. Accurate temperature readings are critical in order to correctly adjust for color and brightness level correction. Based on an environmental parameter such as the temperature of each OLED device within OLED array 112, a second operating parameter of the OLED device, such as the current, may be adjusted to compensate for the variation in light output caused by the environmental parameter, e.g. temperature. Temperature information from temperature sensor 128 is sent to module interface 126 for processing via the data bus TEMPERATURE DATA. An example temperature sensor 128 is an Analog Devices AD7416 device.

Embedded in an OLED tile assembly, the OLED tile control system 100—as well as other parts in the OLED tile assembly, e.g. the power supply of the OLED tile assembly and additional cooling blocks provided as heat sinks e.g. at the back of the OLED array 112—are cooled by a cooling fluid, e.g. by airflow, as a result of the action of one or more cooling fans. These cooling fans can be conventional DC fans capable of providing a volume rate of airflow of between 2 and 5 cubic feet per minute (cfm) in order to maintain an operating temperature within the OLED tile assembly of between 10 and 50° C. An example of a cooling fan that can be used is a Delta Electronics model BFB0505M. The power supply of the OLED tile assembly provides DC power to the cooling fans.

Figure 2:
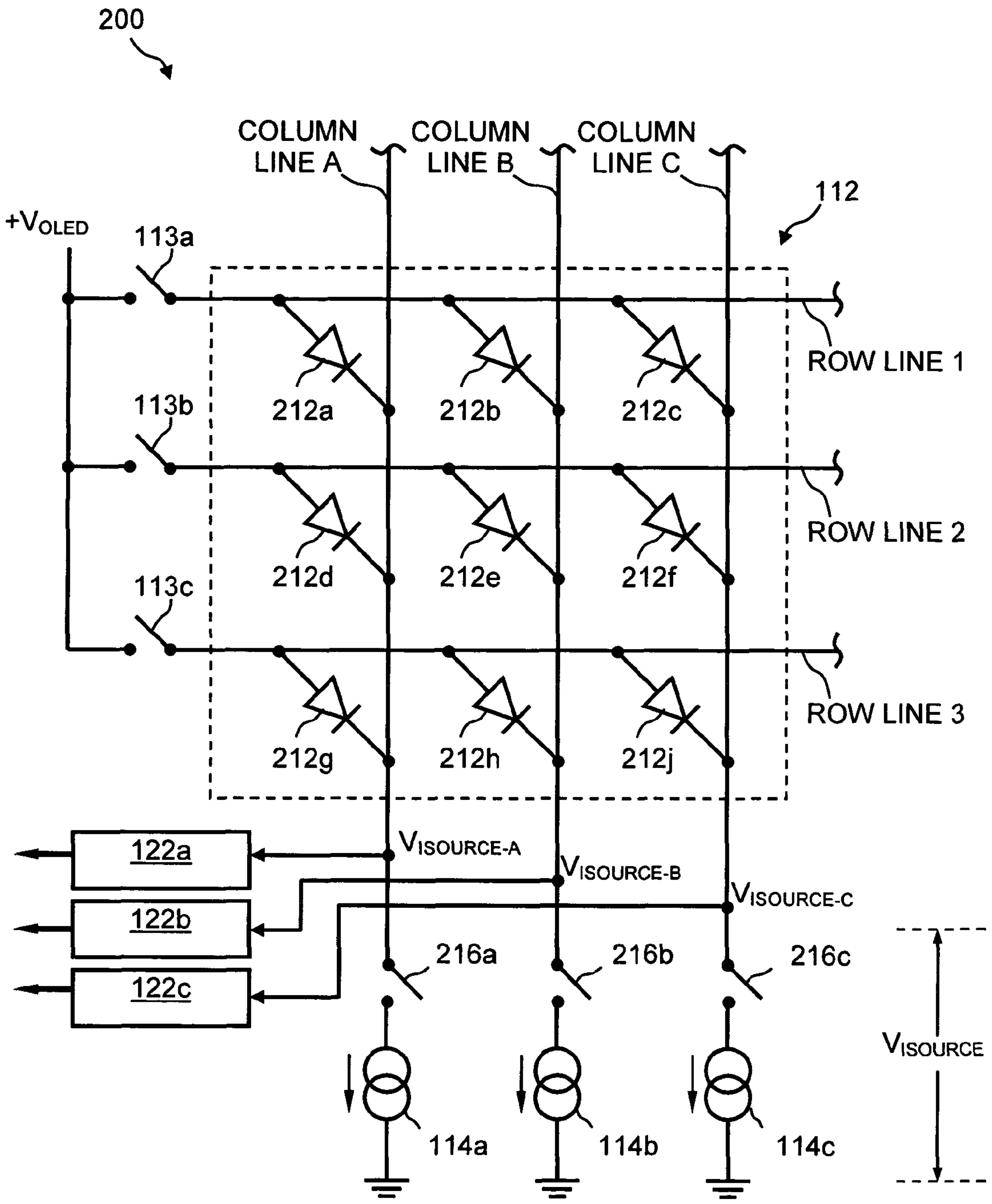
FIG. 2 illustrates a schematic diagram of an OLED circuit that is representative of a portion of a typical common-anode, passive-matrix, large-screen OLED array.

FIG. 2 illustrates a schematic diagram of an OLED circuit 200, which is representative of a portion of a typical common-anode, passive-matrix, large-screen OLED array. OLED circuit 200 includes OLED array 112 formed of a plurality of OLEDs 212*a*-212*j*, each having an anode and cathode, arranged in a matrix of rows and columns. For example, OLED array 112 is formed of OLEDs 212*a*, 212*b*, 212*c*, 212*d*, 212*e*, 212*f*, 212*g*, 212*h*, and 212*j* arranged in a 3×3 array, where the anodes of OLEDs 212*a*, 212*b*, and 212*c* are electrically connected to a row line ROW LINE 1, the anodes of OLEDs 212*d*, 212*e*, and 212*f* are electrically connected to a row line ROW LINE 2, and the anodes of OLEDs 212*g*, 212*h*, and 212*j* are electrically connected to a row line ROW LINE 3. Furthermore, the cathodes of OLEDs 212*a*, 212*d*, and 212*g* are electrically connected to a column line COLUMN LINE A, the cathodes of OLEDs 212*b*, 212*e*, and 212*h* are electrically connected to a column line COLUMN LINE B, and the cathodes of OLEDs 212*c*, 212*f*, and 212*j* are electrically connected to a column line COLUMN LINE C.

A pixel, by definition, is a single point or unit of programmable color in a graphic image. However, a pixel may include an arrangement of sub-pixels, for example, red, green, and blue sub-pixels. Each OLED 212*a*-212*j* represents a sub-pixel (typically red, green, or blue; however, any color variants are acceptable) and emits light when forward-biased in conjunction with an adequate current supply, as is well known.

In the embodiment shown in the drawings, column lines COLUMN LINE A, COLUMN LINE B, and COLUMN LINE C are driven by separate constant current sources $I_{SOURCES}$ 114*a*-114*c* via a plurality of switches 216*a*-216*c*. More specifically, column line COLUMN LINE A is electrically connected to current source $I_{SOURCE}$ 114*a* via switch 216*a*, column line COLUMN LINE B is electrically connected to current source $I_{SOURCE}$ 114*b* via switch 216*b*, and column line COLUMN LINE C is electrically connected to current source $I_{SOURCE}$ 114c via switch 216c. Switches 216a-216c may be formed of conventional active switch devices, such as MOSFET switches or transistors having suitable voltage and current ratings.

A positive voltage (+$V_{OLED}$) from a voltage regulator (not shown), typically ranging between 3 volts (i.e., threshold voltage 1.5V to 2V+voltage $V_{ISOURCE}$ over current source, usually 0.7 V) and 15-20 volts, may be electrically connected to each respective row line via a plurality of bank switches 113a-113c. More specifically, row line ROW LINE 1 is electrically connected to positive voltage +$V_{OLED}$ via bank switch 113a, row line ROW LINE 2 is electrically connected to positive voltage +$V_{OLED}$ via bank switch 113b, and row line ROW LINE 3 is electrically connected to positive voltage +$V_{OLED}$ via bank switch 113c. Bank switches 113a-113c my be formed of conventional active switch devices, such as MOSFET switches or transistors having suitable voltage and current ratings.

The matrix of OLEDs 212a-212j within OLED circuit 200 is arranged in the common anode configuration. In this way, the current source voltage and the supply voltage are independent of one another, providing better control of the light emission.

In operation, to activate (light up) any given OLED 212a-212j, its associated row line ROW LINE 1, ROW LINE 2, ROW LINE 3 is connected to positive voltage +$V_{OLED}$ via its bank switch 113a-113c, and its associated column line COLUMN LINE A, COLUMN LINE B, COLUMN LINE C is connected to its current source $I_{SOURCE}$ 114a-114c via its switch 216a-216c. However, with reference to FIG. 2, the operation of a specific OLED 212 is as follows. For example, in order to light up OLED 212b, simultaneously, a positive voltage +$V_{OLED}$ is applied to row line ROW LINE 1 by closing bank switch 113a and current source $I_{SOURCE}$ 114b is connected to column line COLUMN LINE B by closing switch 216b. At the same time, bank switch 113b, bank switch 113c, switch 216a, and switch 216c are opened. In this way, OLED 212b is forward-biased and current flows through OLED 212b. Once a device threshold voltage of typically 1.5-2 volts across the OLED 212b is achieved, OLED 212b starts emitting light. OLED 212b remains lit up as long as bank switch 113a remains closed and thus is selecting positive voltage +$V_{OLED}$ and switch 216b remains closed and thus is selecting current source $I_{SOURCE}$ 114b. To deactivate OLED 212b, switch 216b is opened and the forward-biasing of OLED 212b is removed.

Along a given row line ROW LINE 1, ROW LINE 2, ROW LINE 3, any one or more OLED 212a-212j may be activated at any given time. By contrast, along a given column line COLUMN LINE A, COLUMN LINE B, COLUMN LINE C, only one OLED 212a-212j may be activated at any given time. Thus, a complete image is built from sequentially or randomly selecting each row of OLED array 112, by closing its corresponding switches 113a-113c. In each row a current with a certain density and a certain duration is sent through the diodes 212a-212c, 212d-212f, 212g-212j on that row by current sources 114a-114c by closing and opening switches 216a, 216b, 216c, such as to display the correct intensity in each pixel or sub-pixel. A switch 113a, 113b, 113c remains closed as long as its row is selected and opens when the next row is selected. All switches 216a, 216b, 216c open before the next row is selected. In the above-described operation, the states of all switches 216a-216c and bank switches 113a-113c are dynamically controlled by external control circuitry (not shown).

Additionally, a first operational parameter indicative of aging, e.g. a voltage $V_{ISOURCE}$ across each current source $I_{SOURCE}$ 114a, 114b, 114c, may be measured via a plurality of A/D converters 122 as each OLED 212 is activated in a predetermined sequence. More specifically, it is assumed that $V_{ISOURCE-A}$ represents the voltage across current source $I_{SOURCE}$ 114a and may be measured via A/D converter 122a, $V_{ISOURCE-B}$ represents the voltage across current source $I_{SOURCE}$ 114b and may be measured via A/D converter 122b, and $V_{ISOURCE-C}$ represents the voltage across current source $I_{SOURCE}$ 114c and may be measured via A/D converter 122c. A/D converter 122a, A/D converter 122b, and A/D converter 122c convert the analog voltage values of $V_{ISOURCE-A}$, $V_{ISOURCE-B}$, and $V_{ISOURCE-C}$, respectively, to digital values and subsequently feed this voltage information back to the local or remote processor device via communications links such as the bus DIGITAL VOLTAGE.

The value of the voltage $V_{ISOURCE}$ across current sources 114a, 114b, 114c tends to drop as OLEDs 212 age, i.e., OLEDs 212 become more resistive with age, and their light emission falls. More specifically, for a set value of positive voltage +$V_{OLED}$, as a given OLED 212 becomes more resistive with age, the voltage drop across that OLED 212 increases and, thus, the voltage drop across its associated current source $I_{SOURCE}$ 114a-114c decreases. Therefore, the value of the voltage $V_{ISOURCE}$ across the current source 114a-114c at any given time is an indicator of the light output performance of any given OLED 212, or thus is a first operational parameter indicative of aging. Accordingly, a second operating parameter of the OLED device is changed, e.g. a voltage compensation to increase the positive voltage +$V_{OLED}$ is performed periodically to compensate for any decrease in voltage $V_{ISOURCE}$ across current sources 114a, 114b, 114c due to the aging of any particular OLED 212.

The measured value of the voltages $V_{ISOURCE}$ across each of the current sources 114a-114c may be stored in EEPROM 124 for interrogation by module interface 126 associated with tile processing unit 110. For example, the voltage $V_{ISOURCE}$ over a current source 114a-114c is measured for each OLED 212 in column COLUMN A, then in column COLUMN B, then in column COLUMN C, as follows. The voltage $V_{ISOURCE-A}$ over current source 114a is measured for OLED 212a, then for OLED 212d, and finally for OLED 212g by closing switch 216a and sequencing through bank switch 113a, then bank switch 113b, and finally bank switch 113c, while storing the measured value of the voltage $V_{ISOURCE-A}$ over the current source 114a for OLEDs 212a, 212d, and 212g in sequence. Likewise, the voltage $V_{ISOURCE-B}$ across the current source 114b is measured for OLED 212b, then for OLED 212e, and finally for OLED 212h by closing switch 216b and sequencing through bank switch 113a, then bank switch 113b, and finally bank switch 113c, while storing the measured value of the voltage $V_{ISOURCE-B}$ across current source 114b for OLEDs 212b, 212e, and 212h in sequence. Finally, the voltage $V_{ISOURCE-C}$ across current source 114c is measured for OLED 212c, then for OLED 212f, and finally for OLED 212j by closing switch 216c and sequencing through bank switch 113a, then bank switch 113b, and finally bank switch 113c, while storing the measured value of the voltage $V_{ISOURCE-C}$ across current source 114c for OLEDs 212c, 212f, and 212j in sequence. Having collected all the voltage measurements $V_{ISOURCE}$ across current sources 114a-114c associated with OLED circuit 200, only the worst-case value, i.e., the least positive measurement, need be kept in local storage, such as within EEPROM 124.

This worst-case value of the voltage $V_{ISOURCE}$ across the current sources 114*a*-114*c* is subsequently compared with an expected minimum value that is typically in the range of 0.7 to 1.0 volts. If the worst-case value of the voltage $V_{ISOURCE}$ across the current sources 114*a*-114*c* is less than this expected minimum value, the positive voltage $+V_{OLED}$ is increased by tile processing unit 110 by increasing the potential of its source, a programmable power supply (not shown), via a communications link. The voltage increase of positive voltage $+V_{OLED}$ must be sufficient to raise the value of the voltage $V_{ISOURCE}$ across the current sources 114*a*-114*c* to within the expected range for that worst case OLED 212. In this way, the proper current flow through all OLEDs 212 to ensure proper and uniform light output across the entire OLED array 112 is maintained. Thus, voltage compensation is accomplished for any decrease in the voltage $V_{ISOURCE}$ across the current sources 114*a*-114*c* due to the aging of any particular OLED 212.

Figure 3:
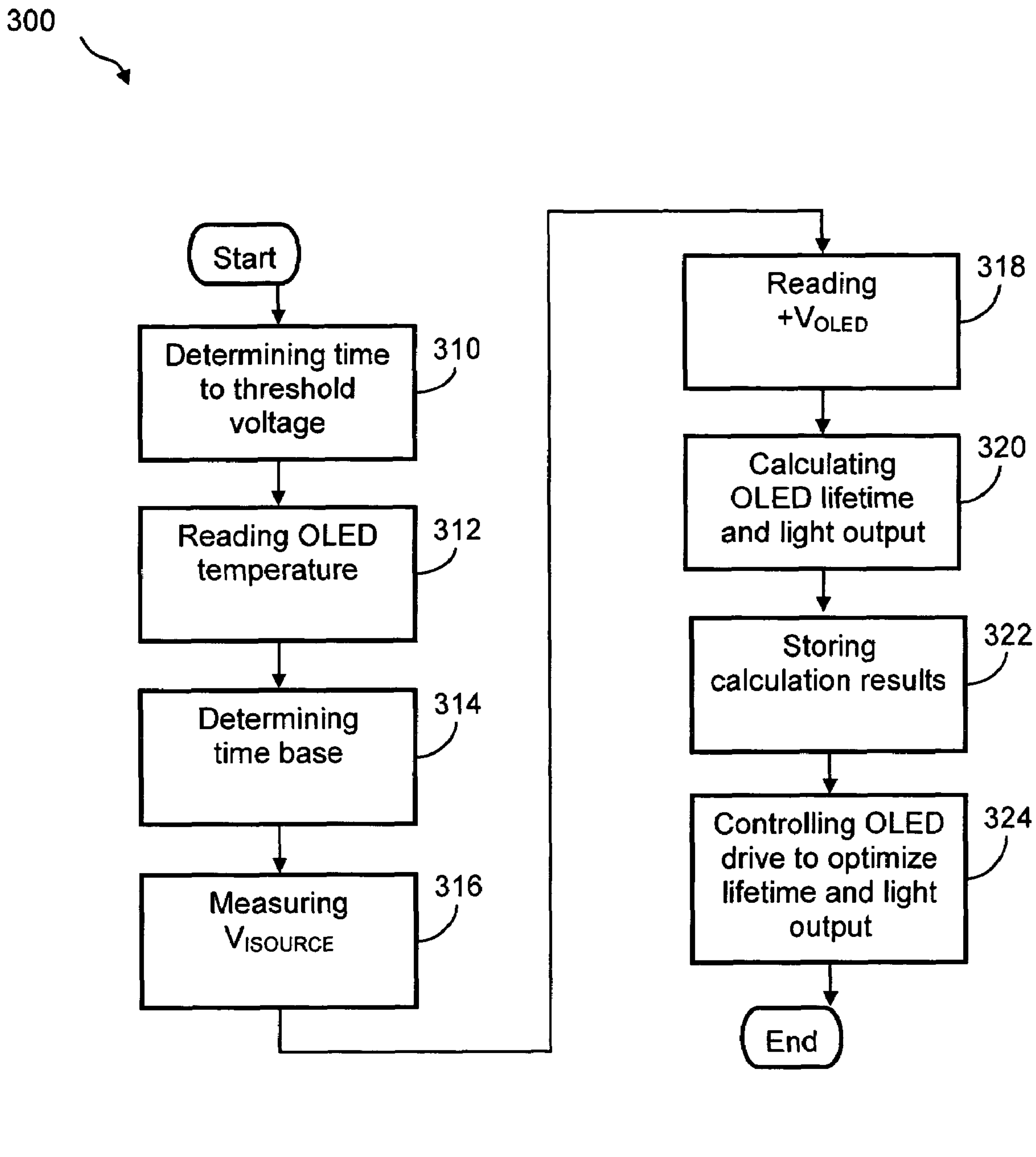
FIG. 3 is a flow diagram of a method of measuring and controlling an OLED display element for improved lifetime and light output in accordance with an embodiment of the present invention.

FIG. 3 is a flow diagram of a method 300 of measuring and controlling an OLED display in accordance with the invention. FIGS. 1 and 2 are referenced throughout the steps of method 300. Method 300 includes the following steps:

Step 310 Determining Time to Threshold Voltage

In this step, pre-processor 120 determines a first parameter indicative of aging, e.g. the time duration required for the voltage across an OLED 212 to attain its threshold value from its initial voltage. The threshold voltage is defined as the minimum voltage across OLED 212 that causes illumination. The threshold voltage increases during the lifetime of OLED 212 due to aging. As a consequence, the normal operating voltage also increases. At an initial time prior to display operation, the voltage across each OLED 212 is measured as follows. Voltage $V_{ISOURCE}$ across each current source $I_{SOURCE}$ 114 within each OLED circuit 200 is measured via its associated A/D converter 122 as each OLED 212 is activated by systematically applying the illumination current while bank switch controller 116 opens and closes bank switches 113 in a predetermined sequence throughout OLED circuit 200. A/D converter 122 subsequently measures the voltage $+V_{ISOURCE}$ over the current sources 114, which is the signal put on the output of the bus ANALOG VOLTAGE shown in FIG. 1. A/D converters 122 communicate the digital representation of all voltages over the bus DIGITAL VOLTAGE shown in FIG. 1. Pre-processor 120 computes the voltage across each OLED 212 and derives a time to threshold or operating voltage based on the linear relationship between the voltage and pre-charge time required ($dt=C*dV/i$, where C=parasitic OLED capacitance, dV=Voltage across OLED, and i=pre-charge current). Module interface 126 stores the result in EEPROM 124. Method 300 proceeds to step 312.

Step 312: Reading OLED Temperature

In this step, an environmental parameter which affects aging of the OLED device is determined, e.g. temperature information from temperature sensor 128 is sent to module interface 126 for processing via the temperature data bus TEMPERATURE DATA. Temperature measurement is performed every few minutes and the result is stored in EEPROM 124. An example of temperature sensor 128 is an Analog Devices AD7416 device. Method 300 proceeds to step 314.

Step 314: Determining Time Base

In this step, pre-processor 120 determines the ON time of each sub-pixel in the display on a frame-by-frame basis by examining the content of the video source present on the bus RGB DATA shown in FIG. 1 and by accumulating that number in EEPROM 124. Pre-processor 120 also computes an average ON time; the result is stored in EEPROM 124. Method 300 proceeds to step 316.

Step 316: Measuring the Voltage $V_{ISOURCE}$ across the Current Sources 114

In this step, the voltage $V_{ISOURCE}$ across each current source $I_{SOURCE}$ 114 within each OLED circuit 200 is measured to determine, in part, the lifetime of each OLED 212. A/D converters 122 measure voltage $V_{ISOURCE}$ as each OLED 212 is activated in a predetermined sequence. With reference to OLED array 112 of FIG. 2, for example, the voltage $V_{ISOURCE}$ is measured in column COLUMN A, then in column COLUMN B, and then in column COLUMN C, as follows. The voltage $V_{ISOURCE-A}$ across a first current source 114*a* is measured for all OLEDs in a first column COLUMN A, i.e. for OLED 212*a*, then for OLED 212*d*, and finally OLED for 212*g* by closing switch 216*a* and sequencing through bank switch 113*a*, then bank switch 113*b*, and finally bank switch 113*c*. Likewise, the voltage $V_{ISOURCE-B}$ across a second current source 114*b* is measured for all OLEDs in a second column COLUMN B, i.e. first for OLED 212*b*, then for OLED 212*e*, and finally for OLED 212*h* by closing switch 216*b* and sequencing through bank switch 113*a*, then bank switch 113*b*, and finally bank switch 113*c*. Finally, the voltage $V_{ISOURCE-C}$ across a third current source 114*c* is measured for all OLEDs in a third column COLUMN C, i.e. for OLED 212*c*, then for OLED 212*f*, and finally for OLED 212*j* by closing switch 216*c* and sequencing through bank switch 113*a*, then bank switch 113*b*, and finally bank switch 113*c*. This sequence is preformed on a periodic basis, for example every 10-20 hours of operation. Method 300 proceeds to step 318.

Step 318: Reading the Positive Voltage $+V_{OLED}$

In this step, A/D converter 122 measures the voltage $+V_{ISOURCE}$ across the current sources 114*a*-114*c* present on bus ANALOG VOLTAGE as shown in FIG. 1. A/D converters 122 communicate the digital representation of all voltages over the bus DIGITAL VOLTAGE shown in FIG. 1. An external A/D converter 122 measures the positive voltage $+V_{OLED}$, in part to determine the optimal pre-charge required on each OLED 212. The voltage $+V_{OLED}$ may be measured on a periodic basis, for example, every several hours of operation. Pre-charging is recommended, because an OLED device has a large inherent capacitance. Therefore, a pre-charge circuit may be provided which may be integrated within the drive circuitry of an OLED display device in order to overcome the inherent capacitance characteristic, $C_{OLED}$, of the OLED devices therein. Without pre-charging, the voltage across the OLED device will go up very slowly, due to the linear charging of the parasitic capacitance with constant current, resulting in a loss of light output. Therefore, the OLED device preferably is pre-charged to approximately the normal operating voltage $V_{OLED}$. More specifically, a first possible pre-charge method is to apply a pre-charge voltage to the cathode of a given OLED device just prior to the desired "on" time, thereby charging the OLED device rapidly. A second possible pre-charge method is to apply a pre-charge voltage to the anode of a given OLED device while concurrently pulling the cathode to ground just prior to the desired on time, thereby charging the OLED device rapidly. A third possible pre-charge method is to supply additional current to the OLED device just prior to the desired on time, thereby charging the OLED device rapidly. In fact any suitable pre-charge method may be used.

During pre-charge, the OLED device is charged to the normal operating voltage. However, during the lifetime of the OLED devices this normal operating voltage will increase due to aging of the OLED devices. Therefore the pre-charge parameters will have to be changed in order to maintain an optimal pre-charge. The required adaptations depend on the pre-charge method that is used.

If e.g. the third pre-charge method mentioned above is used, the following argumentation is valid. If the time during which the pre-charge is performed is not changed during the lifetime of the OLED devices, this will result in a light loss. The aged OLED devices will only be partly charged during the unchanged pre-charge time, and the resulting voltage will have to be built up by linear charging. In order to obtain an optimal pre-charge, the time during which the pre-charge is performed will have to be increased slightly during the lifetime of the OLED devices. In this way, the OLED parasitic capacitance will be charged to a higher voltage and the required resulting linear charging of the OLED parasitic capacitance will always be minimal, and therefore light loss will also be minimal.

A pre-charge circuit may be provided which may be integrated within the drive circuitry of an OLED display device in order to overcome the inherent capacitance characteristic, $C_{OLED}$, of the OLED devices therein. Method 300 proceeds to step 320.

Step 320: Calculating OLED Lifetime and Light Output

In this step, pre-processor 120 determines the aging factors and light output based on the total ON time, OLED temperature, and positive OLED voltage $+V_{OLED}$. Pre-processor 120 calculates the voltage increase across OLED 212 as a function of the time, as a result of the values for the voltage $V_{ISOURCE}$ across the current sources 114*a*-114*c* and the positive voltage $+V_{OLED}$ measured in steps 316 and 318, respectively. Pre-processor 120 calculates the current density using the following formula, in accordance with a trapped-charge limited conduction mechanism:

$$J = J_{10mA}\left(\frac{V}{V_{10mA}}\right)^n$$

where J is the current density in the OLED 212 [Unit: Amps/m$^2$]; V is the voltage across OLED 212; where $J_{10mA}$ and $V_{10mA}$ are respectively the current density in the OLED and the voltage across the OLED at a known test point i.e. 10 mA; and exponent n is an integer chosen such that the I-V characteristic is matched sufficiently well with measured values. These material constants n, $J_{10mA}$ and $V_{10mA}$ are stored in EEPROM 124. The light output is calculated based on known OLED material data constants stored in EEPROM 124, using the following relation:

$$J=k_1L+k_2L^2$$

where $k_1$ is the inverse of luminous efficiency [Unit: (candela/Amps)−1=Amps/candela], $k_2$ is a measure for the saturation effects [Unit: Amps*m2/candela2], and L is the luminance [Unit: nit=candela/m$^2$]. Lifetime (H) at another temperature condition (T) is derived from the equation below, where $H_0$ and $T_0$ are material constants stored in EEPROM 124:

$$H = H_0 2^{\left(\frac{T_0-T}{10}\right)}$$

The positive voltage $+V_{OLED}$ and total current required for each OLED 212 within OLED array 112 that satisfies the preceding relations for the required brightness at the current aging levels is then determined by tile processing unit 110. Method 300 proceeds to step 322.

Step 322: Storing Calculation Results

In this step, calculation results for OLED lifetime and light output are stored in EEPROM 124 via the input/output bus EEPROM I/O. An advantage to locally storing color correction and additional information specific to an OLED tile on EEPROM 124 is that, when new OLED tiles are added to OLED tile assembly or when OLED tiles are rearranged within OLED tile assembly, valuable color correction, aging factors, and other details are also transported. Therefore, the (new) pre-processor 120 is able to read the existing color correction information specific to that OLED tile from its local EEPROM 124 at any time and is able to make adjustments to the overall control of the OLED display. Method 300 proceeds to step 324.

Step 324: Controlling OLED Drive to Optimize Lifetime and Light Output

In this step, OLED tile control system 100 is optimized according to the results of the aging calculations performed in step 320 and stored in step 322. OLED tile control system 100 according to an embodiment of the present invention provides digital correction of a second operating parameter of the OLED device based on the determination of the environmental parameter and the first operational parameter, e.g. improves cooling, adapts the power supply voltage, adapts the pre-charge, increases the current source current, and adjusts the overall OLED display light level to optimize the lifetime and light output of the OLED display according to the details provided below. The invention in its most general form is, however, not limited to a device and method incorporating a combination of all of the above characteristics. Thereafter method 300 ends.

Pre-processor 120 preferably uses digital correction to adjust the brightness of OLED array 112 to maintain uniformity and prevent color shifts across the entire OLED display. Tile processing unit 110 inputs pixel data from the video source present on the RGB data bus RGB DATA IN shown in FIG. 1 and pre-processor 120 converts each red, green, and blue sub-pixel from 8 bits to 16 bits. Of these 16 bits, 14 are used for color and 2 bits are used for compensation; therefore, video content is not altered by this digital compensation. Each red, green, and blue sub-pixel is multiplied by a digital correction factor, held in EEPROM 124, consisting of a binary number from 0 to 255, and the result is communicated to current sources $I_{SOURCES}$ 114 via pre-processor 120 and CCD controller 118 over the buses CCD CONTROL and PWM CONTROL shown in FIG. 1. Subpixels that have seriously aged receive a high correction value, while pixels that have only slightly aged receive a low correction value.

If digital correction fails, optimization may be performed by adapting the power supply voltage (to allow obtaining the minimum threshold voltage across each of the current sources), adapting the pre-charge applied to the OLED and increasing the current to compensate for aging of individual sub-pixels.

When adapting the power supply voltage, positive voltage $+V_{OLED}$ for every OLED circuit 200 is adjusted such that every voltage value $V_{ISOURCE}$ across a current source 114 within a given OLED circuit 200 is more positive than the minimum current source threshold voltage, i.e. the minimum voltage across the current source for normal operation of the constant current driver in the OLED circuit. Pre-processor 120 performs the task of adjusting positive voltage $+V_{OLED}$ via the communications link BANK CONTROL.

A pre-charge circuit (not shown) that is designed to overcome the inherent capacitance characteristic of the OLED devices ($C_{OLED}$) may be integrated within the drive circuitry of OLED circuit 200. Pre-processor 120 uses the voltage $V_{ISOURCE}$ across each current source $I_{SOURCE}$ 214 (measured in step 316) and positive voltage $+V_{OLED}$ (measured in step 318) to adapt the pre-charge required for the aged pixels to compensate for the loss of OLED light output.

Pre-processor 120 individually increases the ON time of current sources $I_{SOURCE}$ 114 current to compensate for aging of individual sub-pixels according to the lifetime calculations shown in step 320.

Temperature information from temperature sensor 128 stored in EEPROM 124 in step 312 is retrieved by module interface 126 and is used by pre-processor 120 to regulate the speed of the cooling fans in the OLED tile assembly in order to obtain an improved cooling to maintain a safe operating temperature and to reduce aging due to temperature. The OLED tile assembly cooling system has sufficient capacity to satisfy the cooling requirements of an OLED tile throughout its life cycle.

In response to measured control parameters, pre-processor 120 may decrease the overall OLED display light level in order to reduce the temperature and/or to increase the lifetime of the OLEDs. This may be performed by multiplying each red, green and blue sub-pixel by a global correction factor. This global correction factor is the same for each sub-pixel of the display. The global correction factor has a value smaller than 1. Furthermore pre-processor 120 may also decrease the contrast to within predefined limits in response to measured control parameters, to reduce temperature and, therefore, to reduce or slow down aging. It is to be noted that the current brightness level correction does not influence the color or brightness uniformity of the display. It is just an action done to reduce the rate of aging of the OLEDs. This is in contrast to the previous steps, where the aging of each sub-pixel is compensated for by changing a second operating parameter, thus eliminating brightness and color non-uniformities due to aging within the display. As a consequence, in these previous steps e.g. the digital correction values will be different for each sub-pixel.

The invention claimed is:

1. A method for optimizing lifetime of an OLED display element, the OLED display element comprising a plurality of addressable discrete OLED pixels, each of said OLED pixels being driven by a supply voltage and a drive current provided by a current driver, each OLED pixel having a threshold voltage, the method comprising, for an OLED pixel:

determining an environmental parameter which affects aging of an OLED pixel, determining a first operational parameter indicative of aging of the OLED pixel, calculating the OLED pixel lifetime and light output and compensating at least partly for aging by changing a second operating parameter of the OLED pixel based on the determination of the environmental parameter and the first operational parameter in a way that the OLED pixel lifetime and light output are optimized.

2. The method according to claim 1, wherein the second operational parameter is at least one of on-time of the current driver or supply voltage to the OLED pixel.

3. The method according to claim 1, wherein the environmental parameter is obtained by measuring a temperature of the OLED pixel.

4. The method according to claim 1, wherein determining the environmental parameter includes measuring an ambient temperature and estimating the temperature of the OLED pixel from the measured environmental temperature.

5. The method according to claim 4, furthermore comprising storing the measured temperature for each OLED pixel.

6. The method according to claim 1, wherein the first operational parameter is obtained by measuring a voltage across the current driver to determine the threshold voltage or normal operating voltage of the OLED pixel.

7. The method according to claim 1, furthermore comprising measuring the voltage across the current driver to determine a change in time duration required for a voltage across the OLED pixel to attain its threshold voltage or its normal operating voltage.

8. The method according to claim 7, furthermore comprising storing the measured voltage across the current driver for each OLED pixel.

9. The method according to claim 1, furthermore comprising determining an optimal pre-charge required for each OLED pixel.

10. The method according to claim 9, wherein determining an optimal pre-charge comprises determining an OLED drive voltage.

11. The method according to claim 1, wherein the method is applied to a tiled display comprising a plurality of OLED display tiles.

12. The method according to claim 11, furthermore comprising means for reducing temperature differences over two different OLED display tiles.

13. The method according to claim 12, wherein reducing temperature differences over two different OLED display elements comprises adjusting a cooling.

14. The method according to claim 1, wherein intensity and contrast of OLED pixels are set within predefined limits to reduce aging of the OLED display element.

15. An OLED display element, the OLED display element comprising a plurality of addressable discrete OLED pixels, each of said OLED pixels being driven by a supply voltage and a drive current provided by a current driver, each OLED pixel having a threshold voltage, wherein the display element further comprises:

means for determining an environmental parameter which affects aging of an OLED pixel, means for determining a first operational parameter indicative of aging of the OLED pixel, means for calculating the OLED pixel lifetime and light output, and means for compensating at least partly for aging by changing a second operating parameter of the OLED pixel based on the determination of the environmental parameter and the first operational parameter whereby the OLED pixel lifetime and light output are optimized.

16. The display element of claim 15, wherein the means for determining an environmental parameter is a temperature measurement means for measuring the temperature of an OLED pixel.

17. The OLED display element according to claim 16, further comprising a memory element for storing the measured temperature for at least one OLED pixel.

18. The display element of claim 15, wherein the means for determining an environmental parameter is a temperature measurement means for measuring an ambient temperature, further comprising means for estimating a temperature of the OLED pixel from the ambient temperature.

19. The display element according to claim 15, wherein the means for determining a first operating parameter is voltage measurement means for measuring a voltage across the current driver to determine the threshold voltage or normal operating voltage of the OLED pixel.

20. The OLED display element according to claim 19, further comprising a memory element for storing the measured voltage across the current driver for at least one OLED pixel.

21. The OLED display element according to claim 15, wherein the compensation means changes at least one of on-time of the current driver or supply voltage to the OLED pixel.

22. The OLED display element according to claim 15, furthermore comprising a pre-charge adaptation means.

23. The OLED display element according to claim 22, wherein the pre-charge adaptation means comprises means for determining an OLED drive voltage.

24. The OLED display element according to claim 15 in a tiled display comprising a plurality of OLED display tiles.

25. The OLED display element according to claim 24, furthermore comprising means for reducing temperature differences over two different OLED display tiles.

26. The OLED display element according to claim 15, furthermore comprising means for setting intensity and contrast of OLED pixels within predefined limits to reduce aging of the OLED display element.

27. The OLED display system comprising a set of tiled OLED display panels, wherein each display panel is as in claim 15.

28. A control device for controlling an OLED display element comprising a plurality of addressable discrete OLED pixels, each of said OLED pixels being driven by a supply voltage and a drive current controlled by the control device, each OLED pixel having a threshold voltage, wherein the control device comprises:

means for determining an environmental parameter which affects aging of an OLED pixel, means for determining a first operational parameter indicative of aging of the OLED pixel, means for calculating the OLED pixel lifetime and light output, and means for compensating at least partly for aging by changing a second operating parameter of the OLED pixel based on the determination of the environmental parameter and the first operational parameter whereby the OLED pixel lifetime and light output are optimized.

* * * * *